United States Patent
Noguchi et al.

(10) Patent No.: US 7,224,971 B2
(45) Date of Patent: May 29, 2007

(54) MOBILE COMMUNICATION METHOD AND RADIO NETWORK CONTROLLER

(75) Inventors: Katsuhiro Noguchi, Yokohama (JP); Kazuyuki Kozu, Yokosuka (JP); Kota Fujimura, Yokosuka (JP); Takashi Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 68 days.

(21) Appl. No.: 11/094,124

(22) Filed: Mar. 31, 2005

(65) Prior Publication Data
US 2005/0227690 A1    Oct. 13, 2005

(30) Foreign Application Priority Data
Mar. 31, 2004    (JP)    ............................ 2004-107863

(51) Int. Cl.
*H04Q 7/20* (2006.01)
(52) U.S. Cl. ............................. 455/435.1; 455/435.2; 455/435.3; 455/422.1; 455/436; 455/437; 370/328; 370/338
(58) Field of Classification Search ............. 455/435.1, 455/435.2, 435.3, 422.1, 436, 437; 370/328, 370/338
See application file for complete search history.

(56) References Cited

U.S. PATENT DOCUMENTS 5,260,987 A    11/1993    Mauger 6,480,476 B1 *    11/2002    Willars ........................ 370/311

(Continued)

FOREIGN PATENT DOCUMENTS

JP    2006-197653    7/2006

(Continued)

OTHER PUBLICATIONS

"3GPP TS 23.236 V6.0.0", 3RD Generation Partnership Project; Technical Specification Group Services and System Aspects; Intra-domain connection of Radio Access Network (RAN) nodes to multiple Core Network (CN) nodes (Release 6), Dec. 2004, pp. 1-35.

(Continued)

*Primary Examiner*—Joseph Feild
*Assistant Examiner*—Khai Nguyen
(74) *Attorney, Agent, or Firm*—Oblon, Spivak, McClelland, Maier & Neustadt, P.C.

(57) ABSTRACT

A radio network controller connected to a first exchange and a second exchange which manage a same location registration area. The radio network controller includes a manager configured to manage a mobile station under control of the radio network controller, in association with the first exchange or the second exchange; a transfer configured to transfer a signal transmitted from the mobile station to the first exchange or the second exchange which is associated with the mobile station; and a monitor configured to monitor state of the first exchange and the second exchange. The transfer is configured to transfer a signal from the mobile station associated with the first exchange, to the second exchange, when the monitor detects inaccessibility to the first exchange.

7 Claims, 4 Drawing Sheets

U.S. PATENT DOCUMENTS

2004/0156338 A1* 8/2004 Pasanen et al. ............. 370/331
2005/0079853 A1* 4/2005 Hurtta ........................ 455/403

FOREIGN PATENT DOCUMENTS

| KR | 2003-0051427 | | 6/2003 |
| WO | WO 00/21319 | | 4/2000 |
| WO | WO 00/31995 | * | 6/2000 |
| WO | WO 01/91370 A2 | | 11/2001 |
| WO | WO 02/065800 A1 | | 8/2002 |

OTHER PUBLICATIONS

"3GPP TS 25.331 V6.2.0", 3RD Generation Partnership Project, Jun. 2004, pp. 1-1036.

"Universal Mobile Telecommunications System (UMTS; TR 23.913 Turbo-Charger Technical Report version 1.0.0", 3$^{rd}$ Generation Partnership Project (3GPP), XP-002161729, Dec. 13, 1999, pp. 6-18.

* cited by examiner

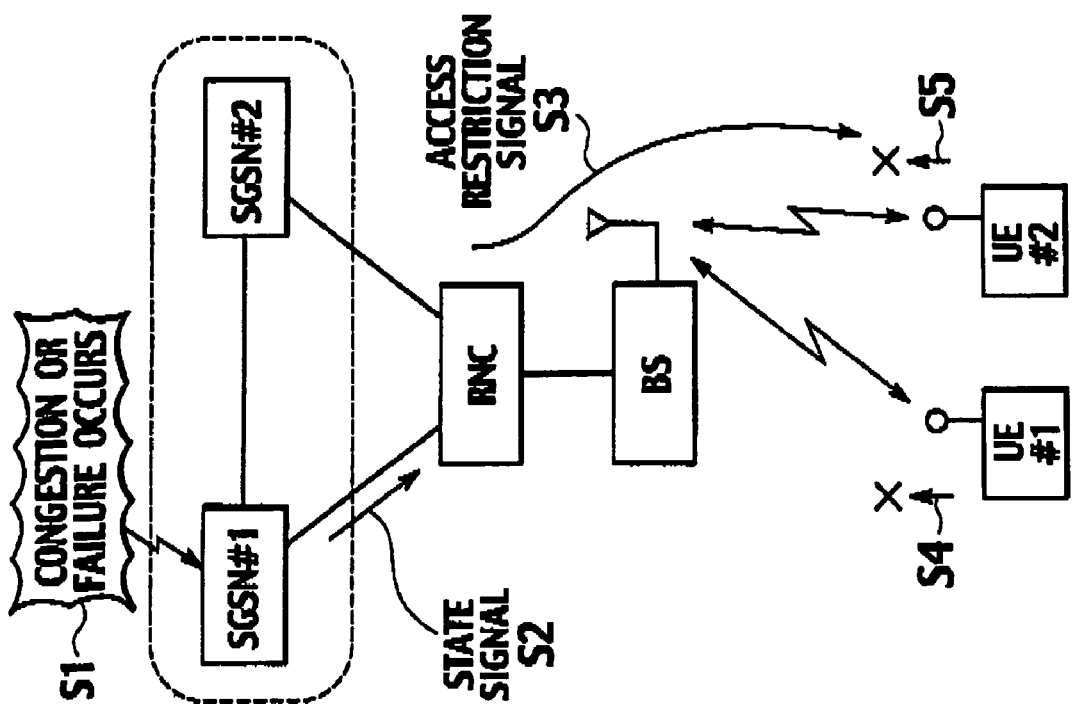
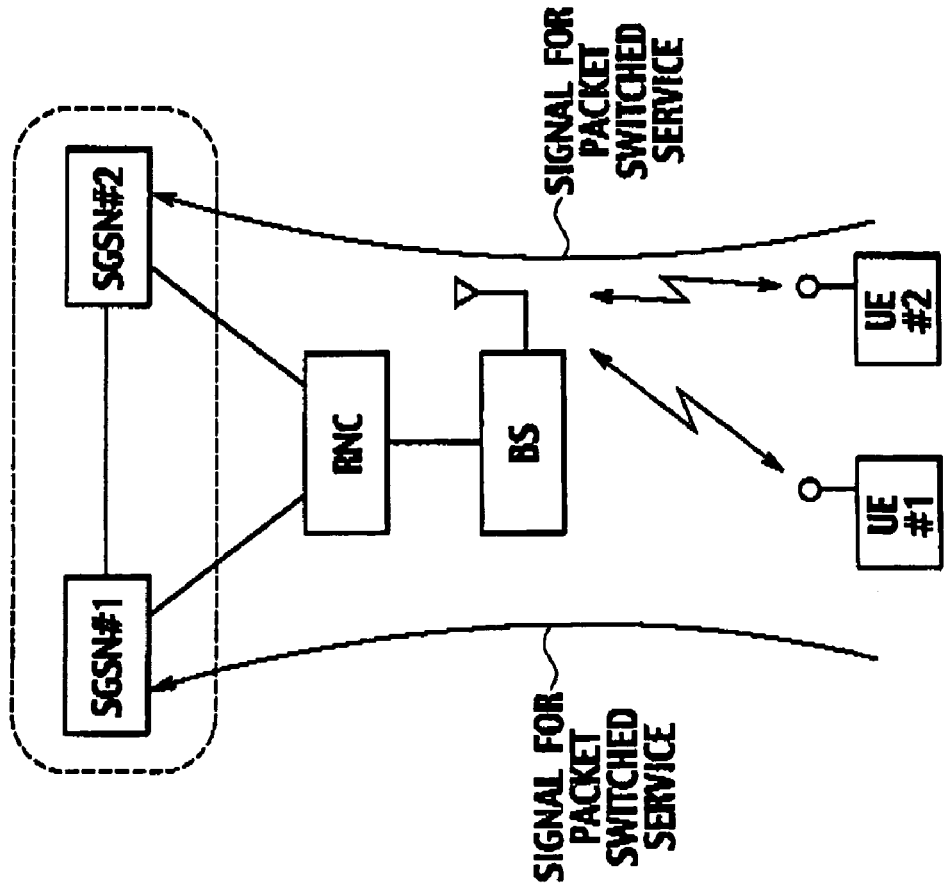

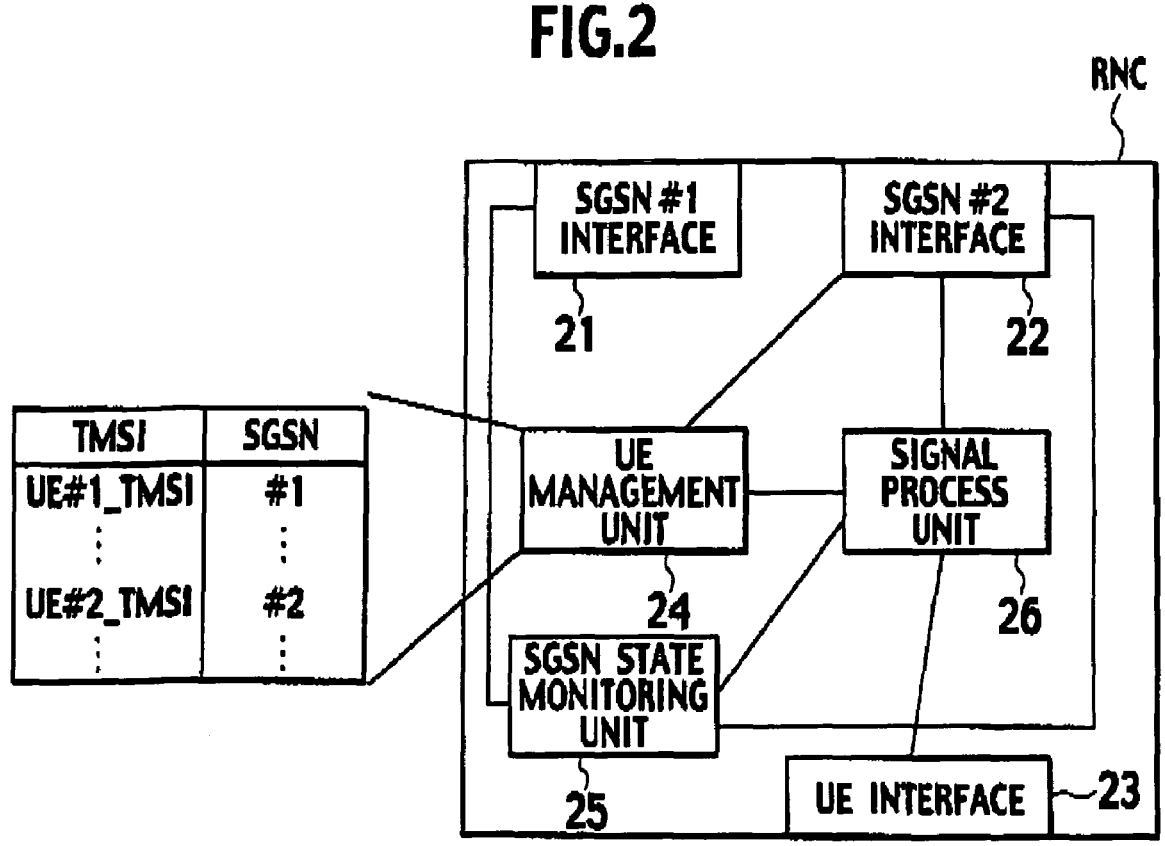

MOBILE COMMUNICATION METHOD AND RADIO NETWORK CONTROLLER

CROSS REFERENCE TO RELATED APPLICATION

This application is based upon and claims the benefit of priority from the prior Japanese Patent Application No. P2004-107863, filed on Mar. 31, 2004; the entire contents of which are incorporated herein by reference.

BACKGROUND OF THE INVENTION

1. Field of the Invention

The present invention relates to a mobile communication method which is performed by a radio network controller, a first exchange and a second exchange which manages one location registration area.

Also, the present invention also relates to a radio network controller which can be used in the mobile communication method.

2. Description of the Related Art

Conventionally, a mobile communication system in which a location registration area is managed by a plurality of exchanges so that processing load in each exchanges can be dispersed is known. Referring to FIGS. 1A and 1B, this type of mobile communication system will be explained.

In this mobile communication system, as shown in FIG. 1A, a radio network controller RNC is connected to a first exchange for a packet switched service (SGSN: serving GPRS support node) #1 and a second exchange for a packet switched service (SGSN) #2, which manage a same location registration area via predetermined interfaces (e.g. Iu-flex interfaces).

When receiving a location registration request from the mobile station UE under the control of the radio network controller RNC, the radio network controller RNC determines an SGSN to which location registration of the mobile station UE is performed, in accordance with the status of load in each SGSNs.

The radio network controller RNC transfers the location registration request from the mobile station UE to the determined SGSN.

In FIG. 1A, the location registration of the mobile station UE #1 is performed to the first SGSN #1, and signals for each type packet switched service are transmitted via the first SGSN #1.

On the other hand, the location registration of the mobile station UE #2, which is located in the same location registration area as the mobile station UE #1, is performed to the second SGSN #2, and signals for each type of packet switched service are transmitted via the second SGSN #2.

However, in the conventional mobile communication system, there has been a problem in that, in the case where congestion or failure occurs in one of a plurality of SGSNs managing the same location registration area, not only mobile stations UE which has performed the location registration to the SGSN but also mobile stations UE which has performed the location registration to other SGSNs fails to transmit signals for each type of packet switched service to the registered SGSNs, that is, those mobile stations UE cannot used the packet switched services in that situation.

Specifically, as shown in FIG. 1B, in step S1, congestion or failure occurs in the first SGSN #1. In step S2, the first SGSN #1 transmits a state signal to the radio network controller RNC for notifying the occurrence of the congestion or the failure.

In step S3, the radio network controller RNC broadcasts an access restriction signal, which restricts accesses to the packet switched service domain, to the mobile stations UE.

Here, in the conventional mobile communication system, the radio network controller RNC cannot specify the first SGSN #1 where the congestion or the failure occurs in the access restriction signal.

Therefore, in step S4, the mobile station UE #1 stops transmitting signals for each type of packet switched service addressed to the first SGSN #1 in accordance with the received access restriction signal.

In step S5, the mobile station UE #2 also stops transmitting signals for each type of packet switched service addressed to the second SGSN #2 in accordance with the received access restriction signal.

BRIEF SUMMARY OF THE INVENTION

The present invention has been made in view of the above problems, and has an object of providing a mobile communication method in which a mobile station which has performed the location registration to a second SGSN managing a same location registration area as a first SGSN can access to the second SGSN which is originally available, when congestion or failure occurs in the first SGSN, and a radio network controller which can used in the mobile communication method.

A first aspect of the present invention is summarized as a radio network controller connected to a first exchange and a second exchange which manage a same location registration area. The radio network controller includes a manager configured to manage a mobile station under control of the radio network controller, in association with the first exchange or the second exchange; a transfer configured to transfer a signal transmitted from the mobile station to the first exchange or the second exchange which is associated with the mobile station; and a monitor configured to monitor state of the first exchange and the second exchange. The transfer is configured to transfer a signal from the mobile station associated with the first exchange, to the second exchange, when the monitor detects inaccessibility to the first exchange.

In the first aspect, the monitor can be configured to receive, from the first exchange, state information which shows occurrence of congestion or failure in the first exchange, so as to detect that the first exchange is inaccessible.

In the first aspect, the monitor can be configured to receive state information which shows load of the first exchange from the first exchange, and to determine a rate for transferring, to the second exchange, a signal from the mobile station associated with the first exchange, in accordance with the load of the first exchange.

In the first aspect, the manager can be configured to manage a temporary user identifier allocated to the mobile station associated with the first exchange or the second exchange, after the mobile station under control of the radio network controller completes location registration to the first exchange or the second exchange.

In the first aspect, the transfer can be configured to transfer a signal from the mobile station associated with the first exchange to the first exchange, when the monitor detects that the first exchange is accessible.

In the first aspect, the transfer can be configured to transfer a specified signal from the mobile station associated with the first exchange to the second exchange, and to transfer other signals to the first exchange, when the monitor detects that the first exchange is inaccessible.

A second aspect of the present invention is summarized as a mobile communication method which is performed by a radio network controller, a first exchange and a second exchange which manages a same location registration area. The mobile communication method includes: transmitting, at a mobile station, a location registration request to the radio network controller; transferring, at the radio network controller, the location registration request from the mobile station to the first exchange, and managing the mobile station in association with the first exchange; detecting, at the radio network controller, that the first exchange is inaccessible; transferring, at the radio network controller, a signal from the mobile station to the second exchange; and performing, at the mobile station, location registration to the second exchange.

BRIEF DESCRIPTION OF THE SEVERAL VIEWS OF THE DRAWINGS

FIGS. 1A and 1B are views of an entire configuration and an operation of a conventional mobile communication system;

FIG. 2 is a functional block diagram of a radio network controller according to an embodiment of the present invention;

DETAILED DESCRIPTION OF THE INVENTION

Figure 3:
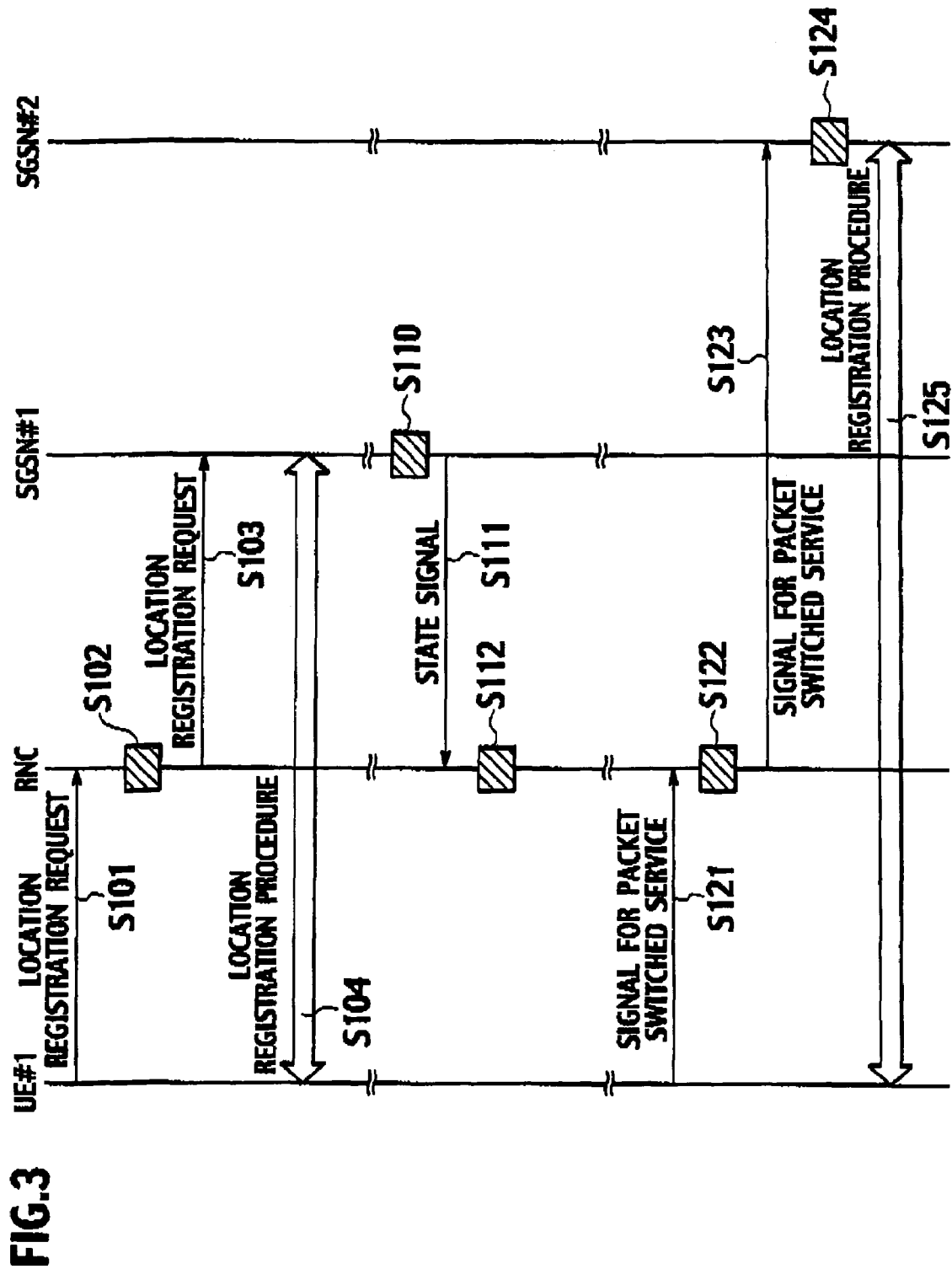
FIG. 3 is a sequence diagram showing an operation of a mobile communication system according to the present embodiment of the present invention.

Configuration of Mobile Communication System According to Embodiment of the Present Invention Referring to FIG. 2, a mobile communication system according to an embodiment of the present invention. The entire configuration of the mobile communication system according to the present embodiment is the same as the entire configuration of the conventional mobile communication system shown in FIGS. 1A and 1B. The configuration of the mobile communication system according to the present embodiment will be described, focusing on the difference from the configuration of the conventional mobile communication system.

A radio network controller RNC of the present embodiment is connected to a first SGSN #1 and a second SGSN #2 which manage a same location registration area (e.g. routing area, location area or the like).

As shown in FIG. 2, the radio network controller RNC includes an SGSN #1 interface 21, an SGSN #2 interface 22, a UE interface 23, a UE management unit 24, an SGSN state monitoring unit 25, and a signal process unit 26.

The SGSN #1 interface 21 is an interface for communications with the SGSN #1, and the SGSN #2 interface 22 is an interface for communications with the SGSN #2.

The UE interface 23 is an interface for communications with mobile stations UE #1 and #2 which are under control of the radio network controller RNC.

Here the SGSN #1 interface 21 and the SGSN #2 interface 22 constitute an Iu-flex interface.

The UE management unit 24 is configured to manage the mobile station UE under the control of the radio network controller RNC in association with the first SGSN #1 or the second SGSN #2.

Specifically, as shown in FIG. 2, the UE management unit 24 is configured to manage a TMSI (Temporary Mobile Subscriber Identity) of the mobile station UE, in association with the identifier of the first SGSN #1 or the second SGSN #2, in accordance with the instruction from the signal process unit 26, after the mobile station UE under the control of the radio network controller RNC performs the location registration to the first SGSN #1 or the second SGSN #2.

In an example of FIG. 2, the mobile station UE #1 performs the location registration to the first SGSN #1, and the mobile station UE #2 performs the location registration to second SGSN #2.

Therefore, the UE management unit 24 associates the TMSI ("UE #1_TMSI") of the mobile station UE #1 with the identifier ("#1") of the first SGSN #1, and the TMSI ("UE #2_TMSI") of the mobile station UE #2 with the identifier ("#2") of the second SGSN #2.

The UE management unit 24 is configured to update its management contents, when detecting that an SGSN for location registration of each mobile station UE is changed, in accordance with an instruction from the signal process unit 26.

The SGSN state monitoring unit 25 is configured to monitor the state of the first SGSN #1 and the second SGSN #2.

For example, the SGSN state monitoring unit 25 is configured to detect inaccessibility to each SGSNs, that is, to detect that each SGSNs is inaccessible.

For example, the SGSN state monitoring unit 25 is configured to detect that failure occurs in each SGSNs, or loads in each SGSNs crosses a predetermined threshold, in accordance with the state signal.

The SGSN state monitoring unit 25 is configured to detect accessibility in each SGSNs, that is, to detect that each SGSNs is accessible.

For example, the SGSN state monitoring unit 25 is configured to detect that the failure is recovered in each SGSNs, or the loads in each SGSNs become smaller than the predetermined threshold, in accordance with the state signal.

The SGSN state monitoring unit 25 may be configured to monitor the loads in each SGSNs in accordance with the state signals transmitted from each SGSNs.

The signal process unit 26 is configured to perform a predetermined process on signals transmitted and received via the interfaces 21 to 23.

Specifically, when receiving a location registration request from the mobile station UE under the control of the radio network controller, the signal process unit 26 is configured to determine an SGSN to which the mobile station UE performs the location registration, in accordance with the loads in the first SGSN #1 and the second SGSN #2, and to transfer the location registration request to the determined SGSN.

Here, the location registration request includes location registration update signal for a packet switched service (Normal Routing Area Update), an attach signal for a packet switched service (GPRS attach) or the like.

The signal process unit 26 is configured to transfer the signals for each type of packet switched service from the mobile station UE under the control of the radio network controller RNC, to the SGSN which performs the location registration of the mobile station UE, that is, the SGSN associated with the mobile station UE in the UE management unit 24.

The signals for each type of packet switched service are any signals to be transmitted when using a packet switched service.

When the SGSN state monitoring unit 25 detects inaccessibility to a predetermined SGSN (first exchange), the signal process unit 26 is configured to transfer signals for each type of packet switched service from the mobile station UE which has performed the location registration to the predetermined SGSN (first exchange) to another accessible SGSN (second exchange).

When the SGSN state monitoring unit 25 detects a recovery of accessibility to the predetermined SGSN (first exchange), the signal process unit 26 may be configured to return the SGSN to which the mobile station UE performs the location registration from the another accessible SGSN (second exchange) to the predetermined SGSN (first exchange), and to transfer the signals for each type of packet switched service to the predetermined SGSN (first exchange).

The signal process unit 26 is configured to notify the UE management unit 24 of the changes of the SGSN to which the mobile station UE under the control of the radio network controller RNC has performed the location registration. When the SGSN state monitoring unit 25 detects inaccessibility to the first SGSN #1, for example, the signal process unit 26 is configured to transfer signal for each type of packet switched service from the mobile station UE #1 which has performed the location registration to the first SGSN #1 to the SGSN #2.

After the mobile station UE#2 has completed performing the location registration to the second SGSN #2, the signal process unit 26 is configured to notify the completion to the UE management unit 24.

As a result, the UE management unit 24 provides a new TMSI to the mobile station UE #1, and associates the new TMSI with the identifier of the SGSN #2.

Even when detecting inaccessibility to a specific SGSN, the signal process unit 26 is configured not to broadcast an access restriction signals for the SGSN to the mobile station UE under the control of the radio network controller RNC via the UE interface 23.

Similarly, even when detecting the recovery of accessibility to the SGSN, the signal process unit 26 is configured not to broadcast an access restriction release signal for the SGSN to the mobile station UE under the control of the radio network controller RNC via the UE interface 23.

The signal process unit 26 may be configured to determine the rate of transmitting signal for each type of packet switched service from the mobile station UE which is associated with the SGSN to other SGSNs, in accordance with the load of each SGSNs which is monitored by the SGSN state monitoring unit 25.

When the load in each SGSNs exceeds the predetermined value, for example, the signal process unit 26 is configured to transfer the signal for each type of packet switched service from the predetermined number of mobile stations UE to the second SGSN #2.

When the SGSN state monitoring unit 25 detects inaccessibility to the first SGSN #1, the signal process unit 26 may be configured to transfer signals specified by the mobile station UE which is associated with the first SGSN #1 to the second SGSN #2, and transfer signals other than the signals specified by the mobile station UE associated with the first SGSN #1 to the first SGSN #1.

Specifically, when the SGSN state monitoring unit 25 detects inaccessibility to the first SGSN #1 (e.g. the load in the first SGSN #1 exceeds a predetermined threshold), the signal process unit 26 is configured to transfer only specified signals to the second SGSN #2 without transmitting all signals from the mobile station UE which is associated with the first SGSN #1.

Operation of Mobile Communication System According to the Present Embodiment

Figure 4:
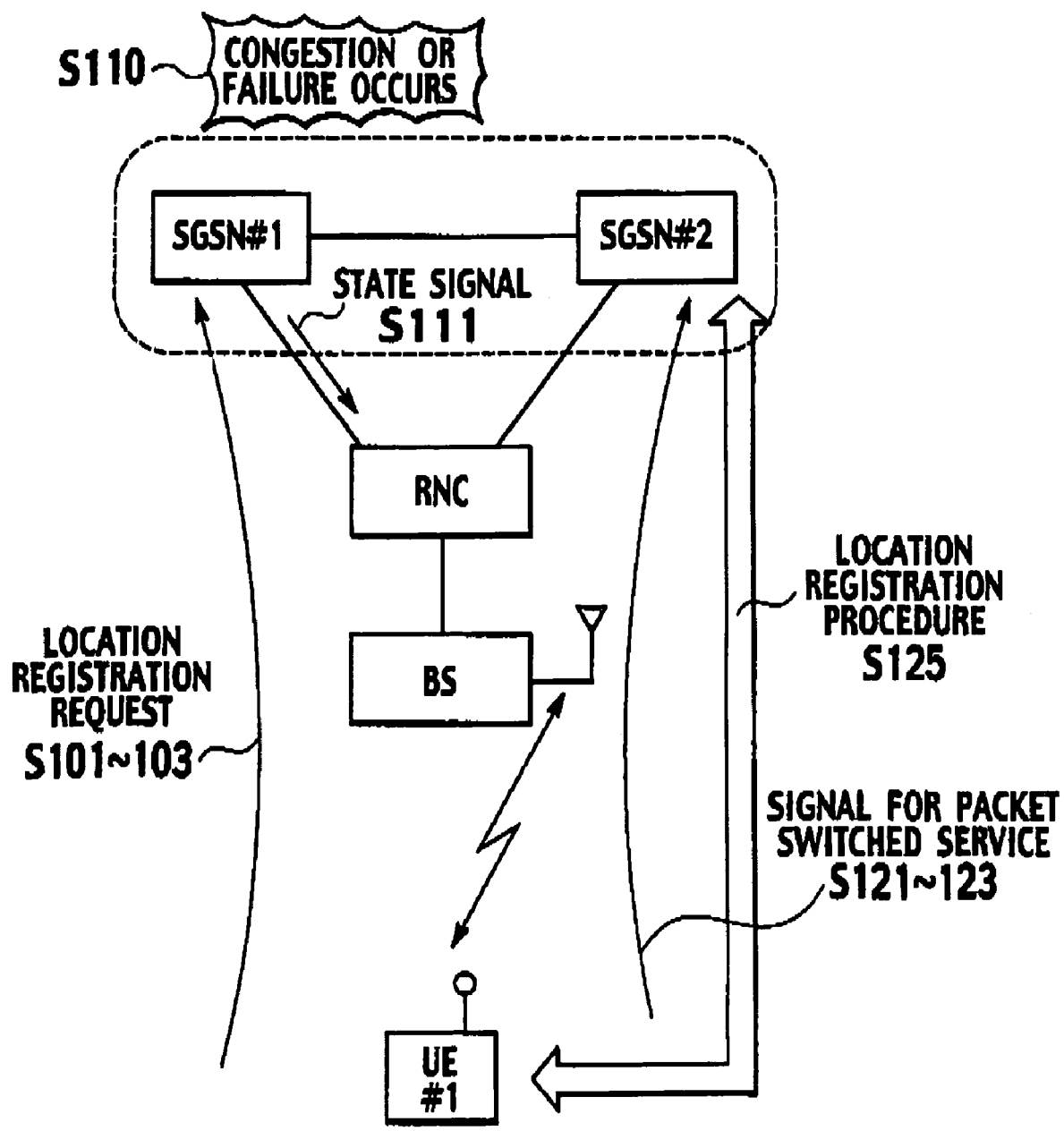
FIG. 4 is a view for explaining an operation of the mobile communication system according to the present embodiment of the present invention.

Referring to FIGS. 3 and 4, an operation of the mobile communication system according to the present embodiment will be described.

In step S101, a mobile station UE #1 which has moved into a location registration area managed by a first SGSN #1 and a second SGSN #2 (or which power is turned on in the location registration area) transmits a location registration request to a radio network controller RNC.

In step S102, the radio network controller RNC determines the first SGSN #1 as an SGSN for location registration of the mobile station UE #1, in accordance with the load in the first SGSN #1 and a second SGSN #2.

In step S103, the radio network controller RNC transfers the location registration request from the mobile station UE #1 to the first SGSN #1.

In step S104, the location registration of the mobile station UE #1 is performed to the first SGSN #1. After the location registration of the mobile station UE #1 to the SGSN #1 is completed, the radio network controller RNC manages a TMSI allocated to the mobile station UE #1 in association with the first SGSN #1.

In step S110, congestion or failure occurs in the first SGSN #1. In step S111, the first SGSN #1 transmits a state signal for notifying the occurrence of the congestion or the failure, to the radio network controller RNC. The radio network controller RNC detects the occurrence of the congestion or the failure in the first SGSN #1 in accordance with the state signal.

In step S121, the mobile station UE #1 transmits a signal for packet switched service to the radio network controller RNC.

In step S122, the radio network controller RNC detects the occurrence of the congestion or the failure in the first SGSN #1 which is a location registration of the mobile station UE #1.

In step S123, the radio network controller RNC transfers the signal for packet switched service to the second SGSN #2. In step S124, the second SGSN #2 detects that the mobile station UE #1 has not performed the location registration to the second SGSN #2. In step S125, the second SGSN #2 performs the location registration of the mobile station UE #1.

Here, the second SGSN #2 may be configured to perform the location registration of the mobile station UE #1, by instructing the mobile station UE #1 to send the location registration request, or the second SGSN #2 may be configured to perform the location registration of the mobile station UE #1, by recognizing the received signal for a packet switched service as a location registration request.

After the location registration of the mobile station UE #1 to the second SGSN #2 is completed, the radio network controller RNC manages the TMSI which is newly allocated to the mobile station UE #1 in association with the second SGSN #2.

Then, when detecting the recovery of accessibility to the first SGSN #1, the radio network controller RNC transfers signals for a packet switched service from the mobile station UE #1 to the first SGSN #1. The first SGSN #1 performs the location registration of the mobile station UE #1.

When the load in the first SGSN #1 exceeds a predetermined value, only signals for a packet switched service from the predetermined number of the mobile station UE are transferred to the second SGSN #2, in accordance with the load in the first SGSN #1. That is, all the signals for a packet switched service from all mobile stations UE which has performed the location registration to the first SGSN #1 are not transferred to the second SGSN #2.

In the present embodiment, the SGSNs are used as a first exchange and a second exchange. However, it should be noted that the present invention is not limited to this case, and an MSC/VLR (Mobile service Switching Center/Visitor Location Register) can be applied in the same way. Here, the "MSC/VLR" indicates an exchange for a circuit switched service.

Operation and Effect of Mobile Communication System According to the Present Embodiment According to the mobile communication system of the present embodiment, a mobile communication method and a radio network controller employed in the mobile communication method are provided. In the mobile communication method, when congestion or failure occurs in the first SGSN #1, the mobile station UE #2, which has performed the location registration to the second SGSN #2 which manages the same location registration area, can access to the second SGSN #2 which is originally available.

As described above, the present invention can provide a mobile communication method in which a mobile station which has performed the location registration to a second SGSN managing a same location registration area as a first SGSN can access to the second SGSN which is originally available, when congestion or failure occurs in the first SGSN, and a radio network controller which can used in the mobile communication method.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A radio network controller connected to a first exchange and a second exchange which manage a same location registration area and at least partially overlapping communication areas, the radio network controller comprising:
   a manager configured to manage a mobile station under control of the radio network controller, in association with the first exchange or the second exchange;
   a transfer mechanism configured to transfer a signal transmitted from the mobile station to the first exchange or the second exchange which is associated with the mobile station; and
   a monitor configured to monitor state of the first exchange and the second exchange, said monitor disposed in the controller and not in the mobile station, wherein
   the transfer mechanism is configured to transfer a signal from the mobile station associated with the first exchange, to the second exchange, when the monitor detects inaccessibility to the first exchange.

2. The radio network controller according to claim 1, wherein the monitor is configured to receive, from the first exchange, state information which shows occurrence of congestion or failure in the first exchange, so as to detect that the first exchange is inaccessible.

3. The radio network controller according to claim 1, the monitor is configured to receive state information which shows a load of the first exchange from the first exchange, and to determine a rate for transferring, to the second exchange, a signal from the mobile station associated with the first exchange, in accordance with the load of the first exchange.

4. The radio network controller according to claim 1, wherein, the manager is configured to manage a temporary user identifier allocated to the mobile station associated with the first exchange or the second exchange, after the mobile station under control of the radio network controller completes location registration to the first exchange or the second exchange.

5. The radio network controller according to claim 1, wherein the transfer mechanism is configured to transfer a signal from the mobile station associated with the first exchange to the first exchange, when the monitor detects that the first exchange is accessible.

6. The radio network controller according to claim 1, wherein the transfer mechanism is configured to transfer a specified signal from the mobile station associated with the first exchange to the second exchange, and to transfer other signals to the first exchange, when the monitor detects that the first exchange is inaccessible.

7. A mobile communication method which is performed by a radio network controller, a first exchange and a second exchange which manages a same location registration area and at least partially overlapping communication areas, the mobile communication method comprising:
   transmitting, at a mobile station, a location registration request to the radio network controller;
   transferring, at the radio network controller, the location registration request from the mobile station to the first exchange, and managing the mobile station in association with the first exchange;
   detecting, at the radio network controller without requiring a separate detecting step at the mobile station, that the first exchange is inaccessible;
   transferring, at the radio network controller, a signal from the mobile station to the second exchange; and
   performing, at the mobile station, location registration to the second exchange.

* * * * *